United States Patent [19]
Castor et al.

[11] Patent Number: 5,155,522
[45] Date of Patent: Oct. 13, 1992

[54] SELF CENTERING BI-DIRECTIONAL ELECTROMAGNETIC ACTUATOR

[75] Inventors: David A. Castor, Webster; Tom M. Seamans, Corfu; J. Kelly Lee, Rochester; David R. Dowe, Holley, all of N.Y.

[73] Assignee: Eastman Kodak Company, Rochester, N.Y.

[21] Appl. No.: 735,980

[22] Filed: Jul. 25, 1991

[51] Int. Cl.$^5$ .......................... G03B 7/08; G03B 9/10
[52] U.S. Cl. .................. 354/456; 354/234.1; 354/250
[58] Field of Search ............... 354/456, 451, 440, 446, 354/234.1, 235.2, 250, 227.1, 258.1, 271.1, 435, 439

[56] References Cited

U.S. PATENT DOCUMENTS 3,455,219 7/1969 Burgarella ........................... 354/451

FOREIGN PATENT DOCUMENTS 3023945 1/1979 Fed. Rep. of Germany .

Primary Examiner—L. T. Hix
Assistant Examiner—J. K. Han
Attorney, Agent, or Firm—Ronald M. Reichman

[57] ABSTRACT

A system for electromagnetically activating the shutter of a camera to provide different aperture openings by providing: an armature comprising a core and a coil, the core is capable of receiving current and the armature will produce a first magnetic field; a movable magnet that produces a second magnetic field, the magnet is positioned within the core in a manner that a first gap, a second gap, a third gap, a fourth gap, a fifth gap, a sixth gap, a seventh gap and a eighth gap will contiguously surround the magnet and be present between the core and the magnet so that the second magnetic field is coupled to the first magnetic field and the magnet is coupled to the shutter; and means coupled to the current means and the coil for setting the direction of current flow in the coil to a first direction or a second direction or for denying the presence of current flow in the coil so that when the coil receives no current a first magnetic field will not be present and the magnet will be at a first location and move the shutter to block the aperture and allow no light to enter the camera, and when current flow through the coil in a first direction the magnet will be attracted by the first magnetic field and move to a second location and move the shutter to form a first aperture size and if current flows through the coil in a second direction the magnet will be attracted by the first magnetic field and move to a third location and move the shutter to form a second aperture size.

22 Claims, 5 Drawing Sheets

SELF CENTERING BI-DIRECTIONAL ELECTROMAGNETIC ACTUATOR

RELATED APPLICATIONS

Reference is made to commonly assigned copending patent applications: U.S. Ser. No. 07/735,510, filed Jul. 25, 1992, entitled "A DEVICE AND METHOD FOR ELECTROMAGNETICALLY ACTIVATING THE SHUTTER OF A CAMERA" filed herewith in the names of J. Kelly Lee, David R. Dowe and Tom M. Seamans; U.S. Ser. No. 07/735,982, filed Jul. 25, 1992, entitled "MULTI-APERTUE MAGNETIC SHUTTER" filed herewith in the names of John H. Alligood, John H. Minnick and David A. Castor; and U.S. Ser. No. 07/735,489, filed Jul. 25, 1992, entitled "A MAGNET AND SHUTTER ASSEMBLY FOR AN ELECTROMAGNETIC SHUTTER" filed herewith in the names of Jude A. Sangregory and Robert L. Kuhn, Jr.

BACKGROUND OF THE INVENTION

1. Field of the Invention

The invention relates generally to the field of photography, and particularly to an electromagnetically driven camera shutter blade.

2. Description of the Prior Art

Leaf type or blade type mechanical shutters have been used to regulate the amount of light that is going to reach the imaging areas of a filmstrip contained within a camera. Typically, the leaf type of shutter is an array of metal "blades" that are pivoted so that they all swing towards or away from the lens aperture of the camera. When the shutter is closed, all the blades are overlapping in the center of the lens aperture and no light reaches the filmstrip. When the shutter is open, the blades pivot away from the center of the aperture, so that light may pass through the aperture and expose the filmstrip. Sometimes an array of metal blades are not used, and the leaf type mechanical shutters may have one or more blades, each of which may have a different diameter opening. When a picture is taken the blade or blades swing away from the center of the lens aperture so that light may pass through the aperture, through the blade or blade openings to expose the filmstrip. If a picture is not being taken, the shutter will be closed. Hence, one blade may block the opening of the other blade, or both blades openings may not be in optical alignment with the aperture. The power to open and close the leaf type mechanical shutters is provided by a spring or springs that are under tension, and the timing is controlled by a watch-type gear train.

Electromagnetic shutters have been developed to reduce the amount of energy or power that is required to open and close leaf type mechanical shutters. Generally electromagnetic shutters require less parts than mechanical shutters. Thus, the manufacturing cost of an electromagnetic shutter is less than the manufacturing cost of mechanical shutters.

The prior art utilized rotary solenoids or monodirectional self returning actuators that only had two magnet positions. The first position was the position of the permanent magnet when the power to the armature was off and the second position was the position of the permanent magnet when the power was on. Thus, if one wanted to use a rotary solenoid to power a camera shutter blade, the shutter blade would have a closed position and an open position. Hence, unless an additional part like an iris diaphragm was utilized to create additional aperture openings, the camera would only have one aperture opening.

Some prior art devices utilized solenoids with linkages that are coupled to the shutter blades to open and close electromagnetic powered shutters. Some of the disadvantages of prior art solenoids are: the solenoids used a large amount of current, i.e. approximately 2 amps; the solenoid had no intermediate positions, i.e., the solenoid and the lens aperture was either open or closed; and the solenoids were slow due to inertia required to move the large mass of the solenoids plunger.

SUMMARY OF THE INVENTION

The present invention overcomes the disadvantages of the prior art, by providing a single electromagnetically driven shutter blade that provides two aperture openings. This invention reduces the number of components that are required in electromagnetic shutters by eliminating the linkage arm, that connected the shutter to the magnet. The permanent magnet is affixed to one end of the shutter blade. The elimination of the linkage arm also reduces the possibility of rotational blade errors.

The elimination of the linkage arm and the elimination of multiple shutter blades reduces the mass of the rotating shutter blade system. Thus, faster shutter speeds are attainable.

Furthermore, this system will operate very consistently since the blade is directly driven by the permanent magnet. The foregoing is achieved by providing:

an armature comprising a core and a coil, the core is capable of receiving current and the armature will produce a first magnetic field;

a movable magnet that produces a second magnetic field, the magnet is positioned within the core in a manner that a first gap, a second gap, a third gap, a fourth gap, a fifth gap, a sixth gap, a seventh gap and a eighth gap will contiguously surround the magnet and be present between the core and the magnet so that the second magnetic field is coupled to the first magnetic field and the magnet is coupled to the shutter; and means coupled to the current means and the coil for setting the direction of current flow in the coil to a first direction or a second direction or for denying the presence of current flow in the coil so that when the coil receives no current a first magnetic field will not be present and the magnet will be at a first location and move the shutter to block the aperture and allow no light to enter the camera, and when current flows through the coil in a first direction the magnet will be attracted by the first magnetic field and move to a second location and move the shutter to form a first aperture size and if current flows through the coil in a second direction the magnet will be attracted by the first magnetic field and move to a third location and move the shutter to form a second aperture size.

DESCRIPTION OF A PREFERRED EMBODIMENT

Figure 1:
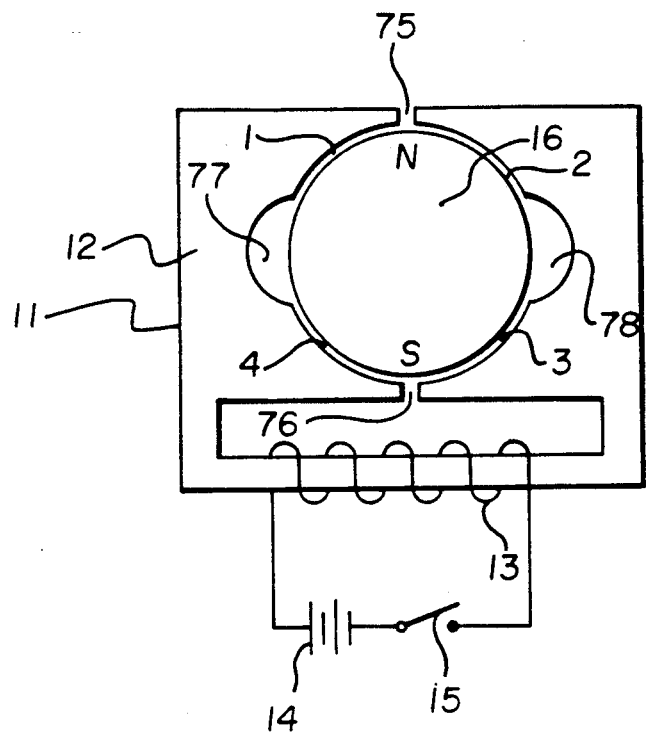
FIG. 1 is a diagram that illustrates the operation of this invention by showing a magnet in a first position.

Referring now to the drawings in detail, and more particularly to FIG. 1, the reference character 11 represents an armature that includes a core 12 and coil 13. Air gaps 1, 2, 3, 4, 75, 76, 77 and 78 appear in armature 11. The positive terminal of battery 14 is connected to one of the ends of coil 13 and the negative terminal of battery 14 is connected to one of the two terminals of switch 15. The second terminal of switch 15 is connected to the other end of coil 13.

Cylindrically shaped permanent magnet 16, which has a North pole (that is indicated on the drawings by the letter N) and a South pole (that is indicated on the drawings by the letter S) is positioned in armature 11 in a manner that gaps 1, 2, 3, 4, 75, 76, 77 and 78 will be present.

The magnitude of the individual arcs of gaps 1, 2, 3 and 4 may be between 5 degrees and 70 degrees. The magnitude of the individual arcs of gaps 75 and 76 may be between 0 degrees and 10 degrees and the magnitude of the individual arcs of gaps 77 and 78 may be between 20 degrees and 170 degrees. The width or magnitude of gaps 1, 2, 3 and 4 are made as narrow as possible to maximize the magnetic interaction between magnet 16 and armature 11 and to permit magnet 16 to rotate within gaps 1–4. Air gaps 75 and 76 magnitude or width should be sized to maximize the fringing flux which drives magnet 16. Gaps 77 and 78 are constructed in a manner that the magnitude of gaps 77 and 78 will be significantly larger than the magnitude of gaps 1–4, so that the magnetic interactions of magnet 16 and armature 11 in the regions of gaps 77 and 78 are insignificant as compared to the magnetic interactions of magnet 16 and armature 11 in gaps 1–4.

The depth of gaps 1, 2, 3, 4, 75, 76, 77 and 78 affects the magnitude of the magnetic forces produced by armature 11. Thus, the magnitude of the magnetic strength of armature 11 may be increased or decreased by respectively increasing or decreasing the depth of armature 11.

Gaps 77 and 78 are utilized to position magnet 16 so that the North pole—South pole axis of magnet 16 is generally perpendicular to the lines of flux created when current passes through coil 13. Gaps 75 and 76 are kept relatively small to not adversely limit the total flux in the electromagnetic path. In addition, the small size of gaps 75 and 76 increases the magnetic attraction that keeps magnet 16 oriented in a stable power off (no current passing through coil 13) position i.e. the North pole—South pole axis of magnet 16 is approximately aligned with the center of gaps 75 and 76.

When switch 15 is open, no current will be supplied to coil 13 and magnet 16 will be positioned in the first position as shown in FIG. 1.

Figure 2:
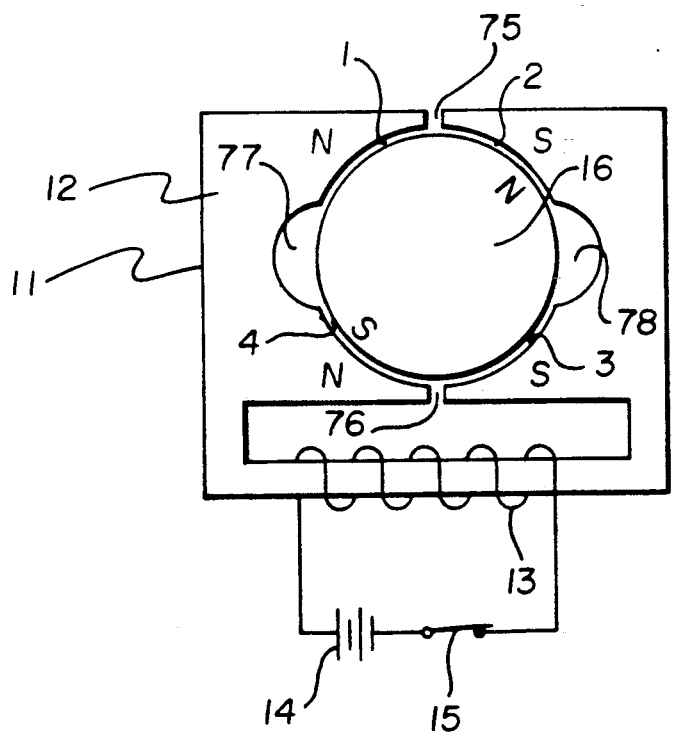
FIG. 2 is a diagram that illustrates the operation of this invention by showing a magnet in a second position.

FIG. 2 illustrates the position of magnet 16 when switch 15 is closed. The closing of switch 15 causes a current from battery 14 to appear in coil 13 and coil 13 to induce a magnetic field. The magnetic field causes the left side of core 12 to act as a North pole and the right side of core 12 to act as a South pole. The electromagnetic flux from armature 11 will interact directly with the magnetic flux of magnet 16 causing magnet 16 to rotate. The North pole of core 12 will attract the South pole of magnet 16 and cause magnet 16 to move to the second position which is shown in FIG. 2.

Figure 3:
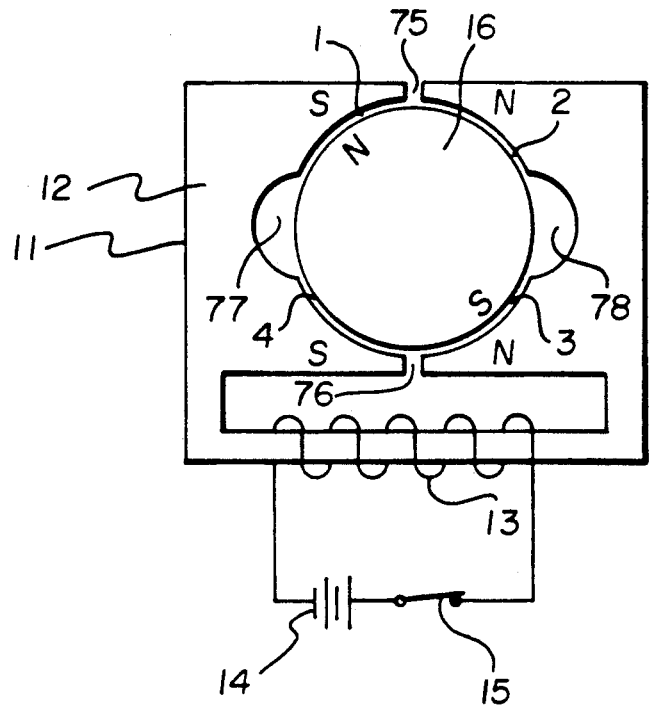
FIG. 3 is a diagram that illustrates the operation of this invention by showing a magnet in a third position.

FIG. 3 depicts the device shown in FIG. 1 and FIG. 2 with the polarity of battery 14 reversed. The closing of switch 15 causes a current from battery 14 to appear in coil 13 and coil 13 to induce a magnetic field. The magnetic field causes the right side of core 12 to act as a North pole and the left side of core 12 to act as a South pole. The electromagnetic flux from armature 11 will interact directly with the magnetic flux of magnet 16 causing magnet 16 to rotate. The North pole of core 12 will attract the South pole of magnet 16 and cause magnet 16 to move to the third position which is shown in FIG. 3.

Figure 4:
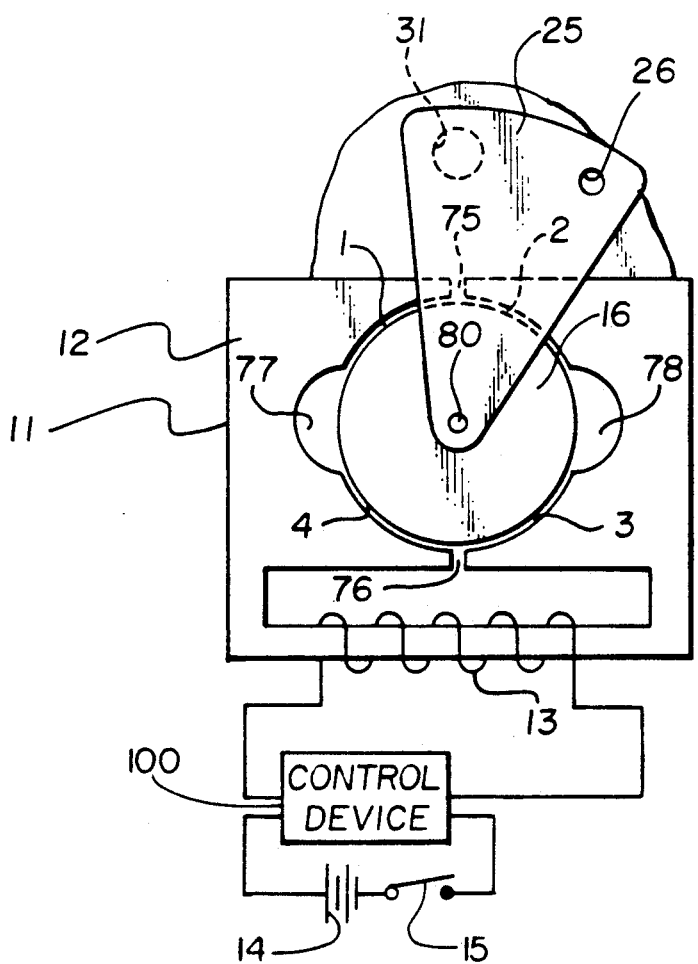
FIG. 4 is a diagram that illustrates a magnet attached to a shutter blade in the first position and the shutter blade blocking the aperture.

FIG. 4 shows magnet 16 having the position shown in FIG. 1 (first position) with coil 13 wrapped around core 12). Switch 15 is connected to one of the ends of coil 13 and one of the terminals of battery 14. The second terminal of battery 14 is connected to polarity controlling device 100. Device 100 is also connected to one of the ends of coil 13. Device 100 controls the direction of current flow in coil 13. The manner in which the coil current is controlled will be more fully set forth in the description of FIG. 9.

Shutter blade 25 has an aperture orifice 26. Blade 25 is shown in a closed position with blade 25 completely covering aperture 31 and not permitting any light to enter the optical path of the camera (not shown). Blade 25 is connected to magnet 16 by placing fastening device 80 (fastening device 80 may be a bolt, a rivet, a screw, a pin, etc.) in an opening of magnet 16 and blade 25. In this instance shutter switch 15 is open, and no current will be supplied to coil 13. Magnet 16 will be in the first position and shutter blade 25 will completely cover aperture 31.

Figure 5:
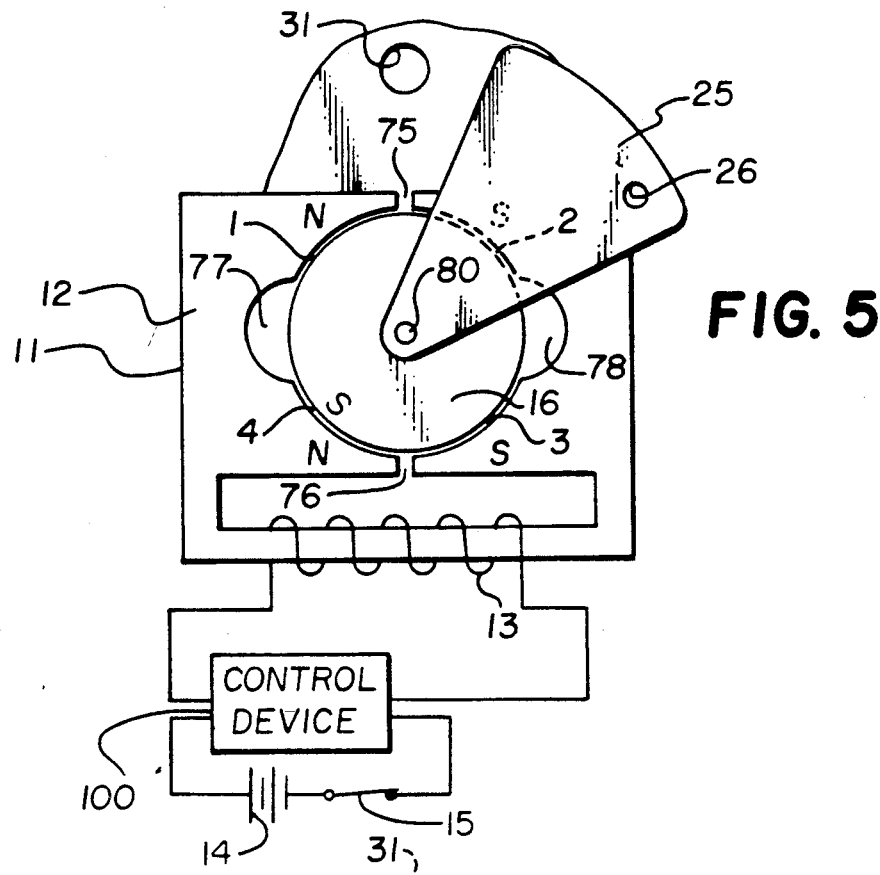
FIG. 5 is a diagram that illustrates a magnet attached to a shutter blade in the second position and the shutter blade forming a large aperture opening.

FIG. 5 shows the components illustrated in FIG. 4 with shutter switch 15 closed. The description of FIG. 9 will describe how device 100 causes current to flow from battery 14 to point 41 through coil 13 to point 42 and back to battery 14 or how device 100 causes current to flow from battery 14 to point 42 through coil 13 to point 41 and back to battery 14.

The closing of switch 15 causes a current from battery 14 to appear in coil 13 and coil 13 to induce a magnetic field. The magnetic field causes the right side of core 12 to act as a South pole and the left side of core 12 to act as a North pole. The electromagnetic flux from armature 11 will interact directly with the magnetic flux of magnet 16 causing magnet 16 to rotate. The North pole of core 12 will attract the South pole of magnet 16 and cause magnet 16 to move to the second position which is shown in FIG. 5. Blade 25 will be in its maximum-aperture open position. Aperture orifices 26 and blade 25 will not cover aperture opening 31. Thus, the maximum amount of light is allowed to enter the camera (not shown).

Figure 6:
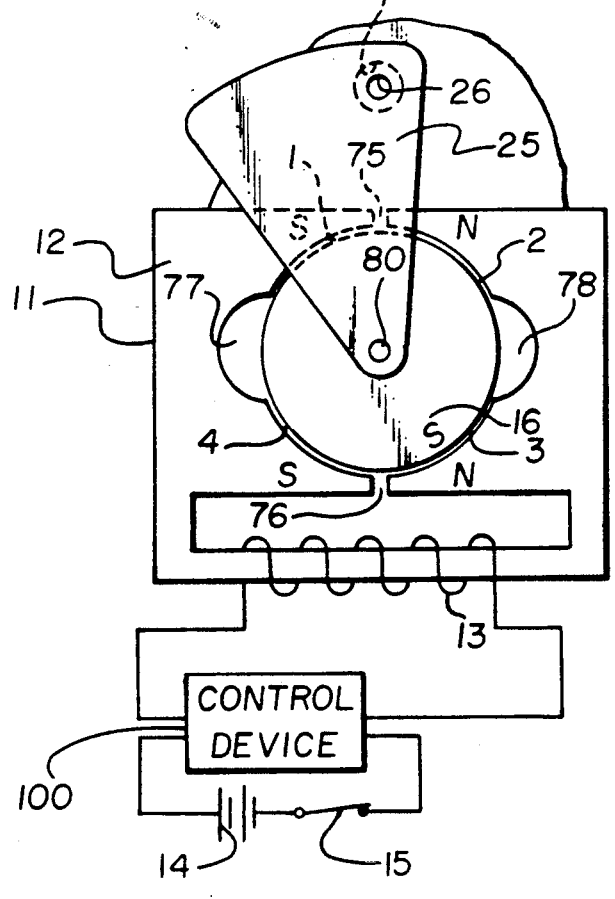
FIG. 6 is a diagram that illustrates a magnet in the third position and the shutter blade forming a small aperture opening.

FIG. 6 shows the components illustrated in FIG. 3 with shutter switch 15 closed. The description of FIG. 9 will describe how device 100 causes current to flow from battery 14 to point 41 through coil 13 to point 42 and back to battery 14 or how device 100 causes current to flow from battery 14 to point 42 through coil 13 to point 41 and back to battery 14.

The closing of switch 15 causes a current from battery 14 to appear in coil 13 and coil 13 to induce a magnetic field. The magnetic field causes the left side of core 12 to act as a South pole and the right side of core 12 to act as a North pole. The electromagnetic flux from armature 11 will interact directly with the magnetic flux of magnet 16 causing magnet 16 to rotate. The North pole of core 12 will attract the South pole of magnet 16 and cause magnet 16 to move to the third position which is shown in FIG. 6. Blade 25 will be in its minimum-aperture open position. Aperture orifice 26 of blade 25 will cover a portion of aperture opening 31 to allow a small amount of light to enter the camera (not shown).

Figure 7:
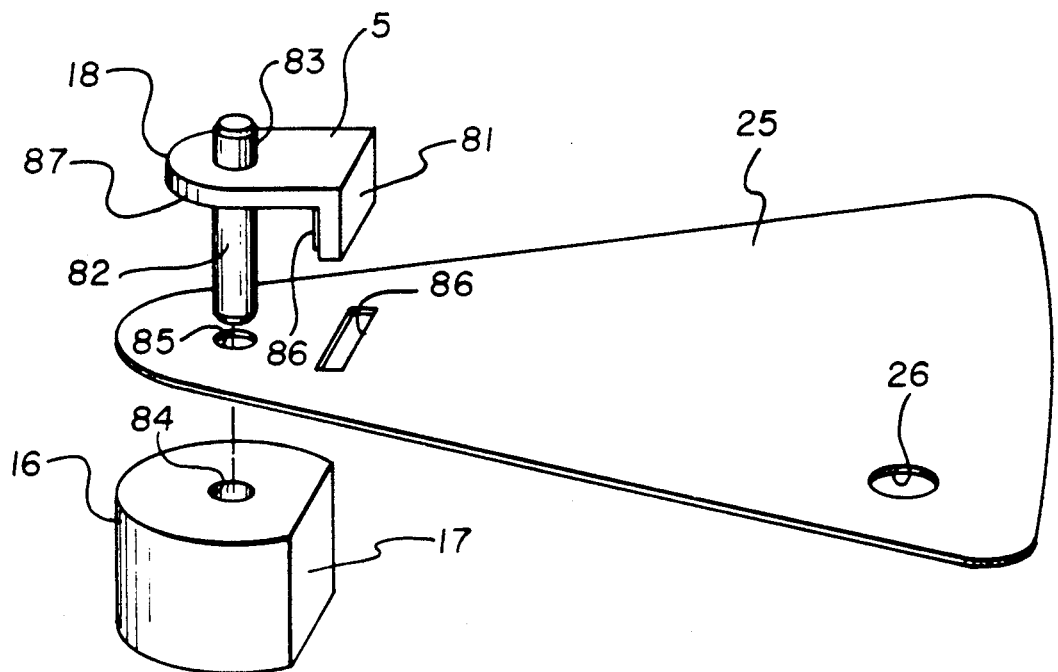
FIG. 7 is a diagram that illustrates a manner in which shutter blade 25 is connected to magnet 16.

FIG. 7 is an exploded view of the alternate components that may be used to connect magnet 16 to shutter blade 25. Magnet 16, which was cylindrically shaped in FIGS. 1-6, now has a D shaped face 17. Magnet 16 may be fabricated in a manner, that face 17 will always act as a North pole. Magnet 16 has a hole 84 running from its top surface to its bottom surface. Blade 25 has: an aperture orifice 26; a hole 85 and a slot 86. Bearing pin 18 has: a flat section 5; a ledge section 81 and pin portions 82 and 83. A plurality of crushed ribs 86 are on the underside of ledge 81.

Pin 82 is inserted into holes 85 and 84 and ledge 81 is inserted into slot 86. Ledge 81 will key blade 25 and pins 82 and 83 together so that bearing pin 84 and blade 25 will rotate as one unit. Ledge 81 also orients blade 25 and bearing pin 18 to D shaped face 17 of magnet 16 to facilitate the connection of the foregoing components. Thus, shutter blade 77 may be properly oriented with respect to magnet 16 without checking the polarity of magnet 16.

The bottom surface 87 of bearing pin 18 will hold blade 25 between it and magnet 16. Crushed ribs 86 create an interference fit between magnet 16 and bearing pin 18 to keep magnet 16 attached to bearing pin 18.

Figure 8:
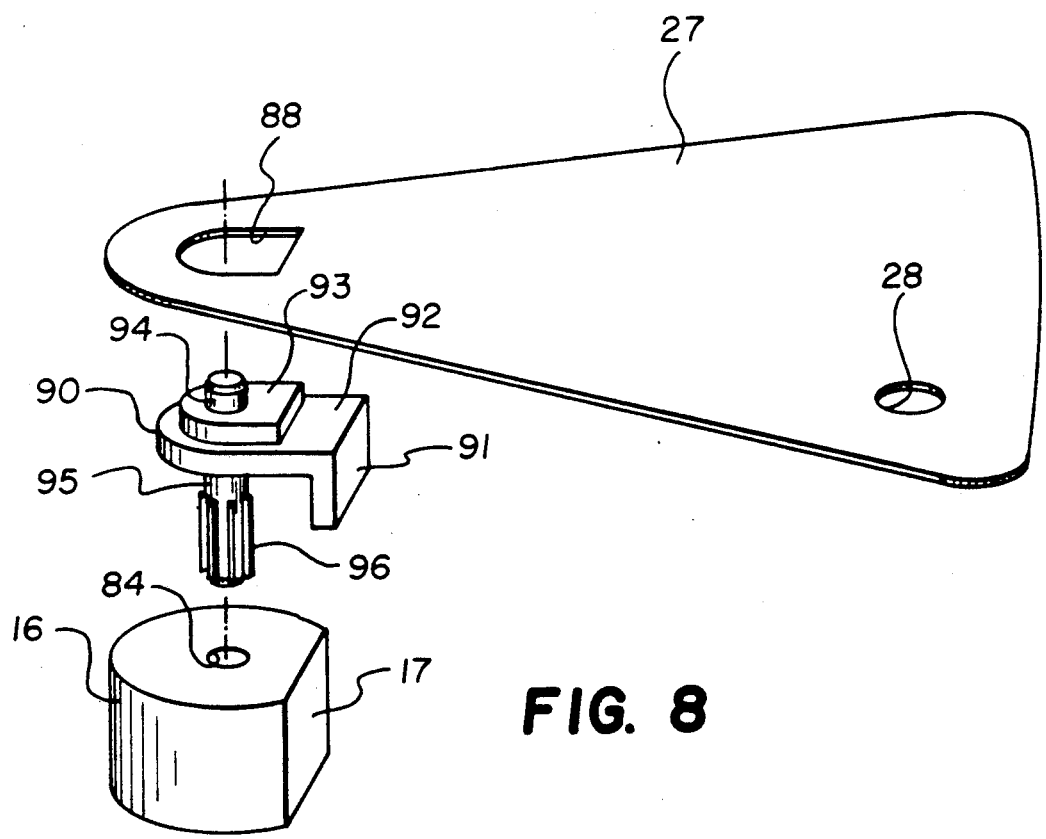
FIG. 8 illustrates an alternate method of connecting shutter blade 25 to magnet 16.

FIG. 8 is an exploded view of an alternate method of connecting a shutter blade to magnet 16. Magnet 16, which was cylindrically shaped in FIGS. 1-6, now has a D shaped face 17. Magnet 16 may be fabricated in a manner, that face 17 will always act as a North pole. Magnet 16 has a hole 84 running from its top surface to its bottom surface. Blade 27 has: an aperture orifice 28; and a slot 88. Bearing pin 90 has: a ledge section 91; a flat section 92; a elongated section 93; and pin portions 94 and 95. A plurality of crushed ribs 96 are on pin 95.

Slot 88 of shutter blade 27 fits over section 93 of bearing pin 90 so that blade 27 and pin 90 will rotate as one unit. Pin 95 is inserted into hole 84 of magnet 16. Crushed ribs 96 create an interface fit between magnet 16 and bearing pin 90 to keep magnet 16 attached to bearing pin 90. Ledge section 91 will be flush with D shaped face 17 of magnet 16. Ledge 91 also orients blade 27 and bearing pin 90 to face 17 of magnet 16 to facilitate the connection of the foregoing components. Thus, shutter blade 77 may be properly oriented with respect to magnet 16 without checking the polarity of magnet 16.

Figure 9:
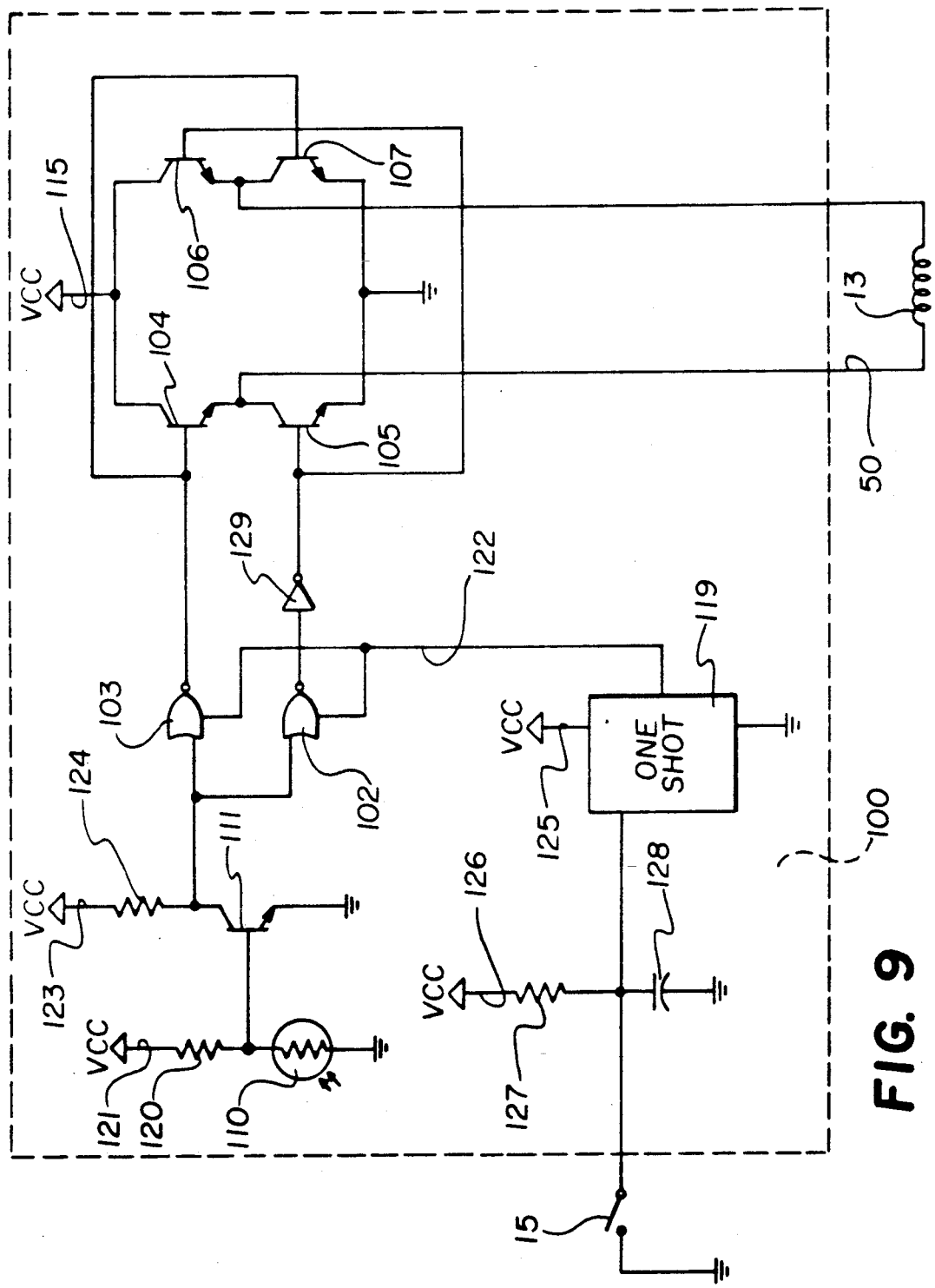
FIG. 9 is a logic diagram of the device for controlling the polarity of the coil shown in FIGS. 4–6.

FIG. 9 describes polarity controlling device 100 that was shown in FIGS. 4-6. Photocell 110 has two terminals. The first terminal is connected to ground, and the second terminal is connected to the base of NPN transistors 111 and one of the ends of resistor 120. The other end of resistor 120 is connected to the positive terminal of battery 14 via wire 121. The emitter of transistor 111 is connected to ground and the collector of transistor 111 is connected to the inputs of NOR gates 102 and 103. The strobe input to gates 102 and 103 is the output of one shot 119 and is transmitted on line 122. The collector of transistor 111 is also connected to one of the ends of resistor 124 and the other end of resistor 124 is connected to the positive terminal of battery 14 via wire 123. The output of gate 102 is coupled to the input of inverter 129 and the output of inverter 129 is coupled to the base of NPN transistor 105 and the base of NPN transistor 106. The output of gate 103 is connected to the base of NPN transistor 104 and the base of NPN transistor 107. The emitter of transistor 104 is tied to the collector of transistor 105 and the emitter of transistor 104 and the collector of transistor 105 are connected to one of the ends of coil 13. The collector of transistor 104 is connected to the collector of transistor 106 and the collectors of the aforementioned transistors are connected to the positive terminal of battery 14 via wire 115. The emitter of transistor 105 is connected to the emitter of transistor 107 and the emitter of the above transistors are connected to ground. One of the ends of coil 13 is connected to the collector of transistor 107 and the emitter of transistor 106.

One of the ends of resistor 127 is coupled to the positive terminal of battery 14 via wire 126, and the other end of resistor 127 is connected to one of the ends of capacitor 128. Resistor 127 is also connected to the input of one shot 119, and to switch 15. Switch 15 is connected to the negative terminal of battery 14. The other end of capacitor 128 is coupled to ground. One shot 119 is coupled to the positive terminal of battery 14 via wire 125 and one shot 119 is also connected to ground.

The pressing of shutter switch 15 will cause a negative ground potential to be placed on the input of one shot 119, which will cause one shot 119 to have a pulsed output which will strobe the inputs of NOR gates 102 and 103. NOR gates 102 and 103 are configured as inverters and will be referred to as inverters hereinafter. When inverters 102 and 103 are enabled by the pulse from one shot 119, their outputs will control transistors 104, 105, 106 and 107 in either a forward fashion or no fashion at all depending on the polarity of the pulse.

The outputs of inverters 102 and 103 are determined by photocell 110. If little or low light is present when someone takes a picture with a camera (not shown) the set trip point of photocell 110 would be at a high potential. This would cause the base of transistor 111 to be at a high potential. Thus, transistor 111 would be off, and a high potential would be on the inputs of inverters 102 and 103. With a high input on inverter 102 and 103 there would be a low output from inverters 102 and 103. The output of inverter 102 is inverted by inverter 129. Thus, inverter 129 has a high output which causes transistors 105 and 106 to be in an off state. The low output from inverter 103 goes to the bases of transistor 104 and 107 causing them to turn on. At this juncture current is transmitted from battery 14 via wire 115 through transistor 104 and through coil 13 through transistor 107 to ground. The foregoing described the low light condition illustrated in FIG. 5. In this instance the left side of core 12 will act as a North pole. Hence, magnet 16 will pivot to the position shown in FIG. 5 (position 2) and shutter blade 25 will be in its maximum open position causing the maximum aperture opening.

When photocell 110 senses a high light condition, photocell 110 causes the base of transistor 111 (whether switch 15 is depressed or not) to turn on. This causes the inputs to inverters 102 and 103 to be low, and the outputs of inverters 102 and 103 to be high. The output from inverter 103 causes transistors 104 and 107 to be high. Thus transistors 104 and 107 are in an off state. The output of inverter 102 is high which causes the output of inverter 129 to be low. This causes transistors 105 and 106 to be turned on which allows current to be transmitted from battery 14 via wire 115 to go through transistor 106 through coil 13 through transistor 105 to ground. Thus, the current travelled in an opposite direction that was previously described. The foregoing is only allowed to happen during the output pulse of one shot 119 that turns on the strobe input of inverters 102 and 103. This only happens when switch 15 is depressed, i.e. when someone wants to take a picture.

In the case where current is transmitted through transistor 106 the light condition illustrated in FIG. 6 would be present. The right side of core 12 of FIG. 6 would act as a North pole. Hence, magnet 16 would pivot to the position shown in FIG. 6 (position 3) and shutter blade 25 would be in its minimum open position. Aperture orifice 26 will form a small aperture opening to allow a small amount of light to enter the camera (not shown).

If switch 15 was not depressed, i.e. if someone did not want to take a picture with the camera (not shown), one shot 119 would not have an output pulse which would strobe the inputs of inverters 102 and 103. Thus, no current would be supplied to coil 13 and the condition illustrated in FIG. 4 would be present. Hence, magnet 16 would pivot to the position shown in FIG. 4 (position 1) so that shutter blade 25 will completely cover aperture 31.

The above specification describes a new and improved system for electromagnetically activating the shutter of a camera. It is realized that the above description may indicate to those skilled in the art additional ways in which the principles of this invention may be used without departing from the spirit. It is, therefore, intended that this invention be limited only by the scope of the appended claims.

What is claimed is:

1. An electromagnetic shutter system for a camera that has a shutter for controlling the amount of light that enters a camera through a lens aperture, said system comprising:
   an armature comprising a core and a coil, said coil is capable of receiving current and said armature will produce a first magnetic field;
   a movable magnet that produces a second magnetic field, said magnet is positioned within said core in a manner that a first gap, a second gap, a third gap, a fourth gap, a fifth gap, a sixth gap, a seventh gap and a eight gap will contiguously surround said magnet and be present between said core and said magnet so that said second magnetic field is coupled to said first magnetic field wherein said fifth and sixth gaps enable said movable magnet to have three stable positions; and said magnet is coupled to the shutter; and
   means coupleable with a source of current and said coil for setting the direction of current flow in said coil to a first or a second direction or for denying the presence of current flow in said coil so that when said coil receives no current a first magnetic field will not be present and said magnet will be at first location and move the shutter to block the aperture and allow no light to enter the camera, and when current flows through said coil in a first direction said magnet will be attracted by the first magnetic field and move to a second location and move the shutter to form a first aperture size and if current flows through said coil in a second direction said magnet will be attracted by the first magnetic field and move to a third location and move the shutter to form a second aperture size.

2. The system claimed in claim 1, wherein the arcs of said first gap, said second gap, said third gap, and said fourth gap will individually be between five (5) degrees and seventy (70) degrees and the magnitude of said first gap, said second gap, said third gap and said fourth gap will be as narrow as possible to maximize the magnetic interaction between said first and second magnetic fields and to permit said magnet to rotate within said first, second, third and fourth gaps.

3. The system claimed in claim 2, wherein the arcs of said fifth gap and said sixth gap will individually be between twenty (20) degrees and one hundred seventy (170) degrees and the magnitude of said fifth and sixth gaps will be sized to significantly larger than the magnitude of said first, second, third and fourth gaps.

4. The system claimed in claim 1, wherein the arcs of said seventh and eighth gaps will individually be between zero (0) and ten (10) degrees and the magnitude of said seventh and eighth gaps will be sized to control the magnitude of the fringing flux which drives said magnet.

5. The system claimed in claim 1, wherein said movable magnet is cylindrically shaped.

6. The system claimed in claim 5, wherein said cylindrically shaped magnet has a D shaped pole face that will indicate the polarity of said magnet to facilitate the assembly of said system.

7. The system claimed in claim 6, further including: means for connecting said magnet to the shutter.

8. The system claimed in claim 7, wherein said connecting means comprises:
   a pin;
   a first surface that is connected to said pin; and
   a second surface that is connected to said first surface;
   whereby, when said pin is inserted in a first orifice in the shutter blade and a orifice in said magnet and said second surface is inserted in a second orifice of the shutter, the shutter will be connected to said magnet and a portion of said second surface will be next to the D shaped pole of said magnet.

9. The system claimed in claim 8, wherein said second surface further includes: crushed ribs that are affixed to a portion of said second surface to create an interference fit between a portion of said second surface and a portion of said magnet.

10. The system claimed in claim 7, wherein said connecting means comprises:
   a pin;
   a first surface that is connected to said pin;
   a second surface that is connected to said first surface; and a third surface that is connected to said second surface;

whereby, when said pin is inserted through a first orifice in the shutter blade and a orifice in said magnet, said first surface will be in said first orifice and the shutter will be connected to said magnet and a portion of said third surface will be next to the D shaped pole of said magnet.

11. The system claimed in claim 10, wherein said pin further includes: crushed ribs that are affixed to a portion of said pin to create an interference fit between a portion of said pin and a portion of said magnet.

12. The device claimed in claim 1 wherein said setting means comprises:

means for sensing the amount of light that is available to take a picture, said sensing means is coupled to said current means;

means coupled to the output of said sensing means and said coil for determining whether current will flow in said coil in a first direction or in a second direction; and means coupled to said current means and said determining means for allowing said determining means to select a first or second direction.

13. The device claimed in claim 12 wherein said sensing means is a photocell that senses light.

14. The device claimed in claim 12 wherein said allowing means comprises:

a switch coupled to said current means; and a properly biased one shot that is coupled to said switch, said current means and a strobing input of said determining means so that said determining means will only select a first or second direction when said switch is closed.

15. The device claimed in claim 12 wherein said allowing means is a switch.

16. The device claimed in claim 12 wherein said sensing means is a sensor that has a first output for a specified amount of light that is available to take a picture and a second output if a different amount of light is available to take a picture.

17. The device claimed in claim 16 wherein said determining means comprises:

means coupled to the output of said sensor for responding to the amount of light that is present, said responding means has a first transmission output if said sensor has a first output and said sensor has a second transmission output if said sensor has a second output;

first logic means for transmitting said first transmission signals, said first logic means is coupled to said first and second transmission signals;

second logic means for transmitting said second transmission signal, said second logic means is coupled to said first and second transmission signals;

third logic means for sending current to said coil in a first direction, said third logic means is coupled to said first logic means, said coil and said current means; and fourth logic means for sending current to said coil in a second direction, said fourth logic means is coupled to said second logic means, said coil, and said current means.

18. The device claimed in claim 17 wherein said responding means is a properly biased transistor.

19. The device claimed in claim 17 wherein said first logic means is a NOR gate.

20. The device claimed in claim 17 wherein said second logic means comprises:

a NOR gate; and an inverter whose input is coupled to the output of said NOR gate and whose output is coupled to said fourth logic means.

21. The device claimed in claim 17 wherein said third logic means comprises:

a first properly biased transistor that is coupled to said first logic means, said current means and one end of said coil; and a second properly biased transistor that is coupled to said first logic means, said current means and the other end of said coil.

22. The device claimed in claim 20 wherein said fourth logic means comprises:

a first properly biased transistor that is coupled to said second logic means, said current means and one end of said coil; and a second properly biased transistor that is coupled to said first logic means, said current means and the other end of said coil.

* * * * *